(12) United States Patent
Kritzer et al.

(10) Patent No.: US 10,455,032 B2
(45) Date of Patent: Oct. 22, 2019

(54) AUTOMATICALLY GENERATING AN ELECTRONIC PRESENTATION FROM LABOR MARKET DATA

(71) Applicant: Microsoft Technology Licensing, LLC, Redmond, WA (US)

(72) Inventors: Andrew H. Kritzer, San Francisco, CA (US); Boyu Zhang, San Francisco, CA (US); Christine Eve Schmidt, San Francisco, CA (US); Kuisong Tong, San Jose, CA (US); Link Gan, San Francisco, CA (US); Sohan Rajpanth Murthy, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 845 days.

(21) Appl. No.: 15/007,012

(22) Filed: Jan. 26, 2016

(65) Prior Publication Data

US 2017/0213295 A1    Jul. 27, 2017

(51) Int. Cl.
| | | |
|---|---|---|
| *G06F 3/01* | (2006.01) | |
| *H04L 29/08* | (2006.01) | |
| *G06Q 50/00* | (2012.01) | |
| *G06Q 10/10* | (2012.01) | |
| *G06F 16/901* | (2019.01) | |
| *G06F 16/33* | (2019.01) | |
| *G06N 7/00* | (2006.01) | |

(52) U.S. Cl.
CPC ............ *H04L 67/22* (2013.01); *G06F 16/334* (2019.01); *G06F 16/9024* (2019.01); *G06Q 10/1053* (2013.01); *G06Q 50/01* (2013.01); *H04L 67/10* (2013.01); *H04L 67/306* (2013.01); *G06N 7/005* (2013.01)

(58) Field of Classification Search
None
See application file for complete search history.

(56) References Cited

U.S. PATENT DOCUMENTS 5,960,407 A * 9/1999 Vivona ................ G06Q 20/10
705/14.44
7,805,382 B2 * 9/2010 Rosen ................ G06Q 10/1053
705/321

(Continued)

*Primary Examiner* — Gurkanwaljit Singh
(74) *Attorney, Agent, or Firm* — Schwegman Lundberg & Woessner, P.A.

(57) ABSTRACT

This disclosure is directed to a social networking server that includes different engines and databases to support the generation of visually meaningful electronic presentations that present member-provided data in one or more graphical and understandable charts and graphs. An electronic presentation includes one or more electronic documents where various ones of the electronic documents are generated from templates that specify the "look-and-feel" for a given type of electronic document. Rather than having to manually enter and design graphs and charts to present member-provided data in a meaningful way, the social networking server leverages the stored electronic document templates to create these charts and graphs. However, as there may be multiple systems involved in creating a given type of chart or graph, the social networking server is tasked with coordinating the efforts of these different systems.

20 Claims, 17 Drawing Sheets

(56) References Cited

U.S. PATENT DOCUMENTS

| | | | |
|---|---|---|---|
| 8,200,527 B1* | 6/2012 | Thompson | G06Q 10/0639 |
| | | | 705/7.39 |
| 9,092,821 B2* | 7/2015 | McGill | G06Q 40/00 |
| 9,135,555 B2* | 9/2015 | Gandhi | G06N 5/02 |
| 9,794,359 B1* | 10/2017 | Lessin | H04L 67/22 |
| 9,798,832 B1* | 10/2017 | Lessin | G06F 17/30991 |
| 2006/0085455 A1* | 4/2006 | Chmura | G06Q 10/06 |
| 2006/0229896 A1* | 10/2006 | Rosen | G06Q 10/10 |
| | | | 705/321 |
| 2006/0271421 A1* | 11/2006 | Steneker | G06Q 10/063112 |
| | | | 705/7.14 |
| 2009/0076987 A1* | 3/2009 | Chmura | G06Q 10/06 |
| | | | 706/11 |
| 2013/0114864 A1* | 5/2013 | Garcia | H04N 7/173 |
| | | | 382/118 |
| 2013/0212479 A1* | 8/2013 | Willis | G06Q 10/10 |
| | | | 715/736 |
| 2014/0095419 A1* | 4/2014 | Gandhi | G06N 5/02 |
| | | | 706/46 |
| 2015/0261742 A1* | 9/2015 | Gandhi | G06N 5/02 |
| | | | 704/9 |
| 2016/0155200 A1* | 6/2016 | Basu | G06Q 40/06 |
| | | | 705/36 R |
| 2018/0004861 A1* | 1/2018 | Lessin | G06F 17/30991 |
| 2018/0054494 A1* | 2/2018 | Lessin | H04L 67/22 |

* cited by examiner

AUTOMATICALLY GENERATING AN ELECTRONIC PRESENTATION FROM LABOR MARKET DATA

TECHNICAL FIELD

The subject matter disclosed herein generally relates to systems and methods for automatically generating electronic presentations and, more particularly, to integrating different data architectures to automatically generate an electronic presentation having various metrics obtained from different data sources.

BACKGROUND

An online social networking service provides a platform whereby a member of the social networking service may connect with other members of the social networking service. The social networking service provides a number of services to the member, such as job seeking services, job hosting services, member profile services, job history services, resume building services, and other such services. From interacting with these services, the social networking service stores information provided by members in a corresponding member profile.

In today's economy, policymakers are interested in the economic well-being of their constituents. Typically, a policymaker decides on a given issue once presented with factual information relevant to the issue. However, gathering such information can be a time-consuming and arduous task as the sources of such information may be disparate and widespread. Furthermore, it can be difficult to present the information in a way that is meaningful and consumable by the policymaker. In this day and age, where policy decisions are made using data-driven approaches, it can be challenging to package information in a manner that is easily understood and shared. Thus, while a policymaker's constituents may provide employment and other economic information to a social networking service, there is a challenge in making that information meaningful and relevant to the policymaker.

BRIEF DESCRIPTION OF THE DRAWINGS

Some embodiments are illustrated by way of example and not limitation in the figures of the accompanying drawings.

DETAILED DESCRIPTION

Example methods and systems are directed to automatically generating electronic presentations and, more particularly, to integrating different data architectures to automatically generate an electronic presentation having various metrics obtained from different data sources. The disclosed embodiments include a client-server architecture where a social networking server has access to a social graph of its social networking members. The social networking server includes various modules and engines that import the member profiles and then extract certain defined attributes from the member profiles, such as employer (e.g., current employer and/or past employers), identified skills, educational institutions attended, and other such defined attributes. The values from these attributes are then used as metrics and measurement data in generating an electronic presentation for a specified geographic location.

Accordingly, in one embodiment, the social networking server includes different engines and databases to support the generation of visually meaningful electronic presentations that present the data provided by members in one or more graphical and understandable charts and graphs. An electronic presentation includes one or more electronic documents where various ones of the electronic documents are generated from templates that specify the "look-and-feel" for a given type of electronic document. Rather than having to manually enter and design graphs and charts to present member-provided data in a meaningful way, the social networking server leverages the stored electronic document templates to create these charts and graphs. However, as there may be multiple systems involved in creating a given type of chart or graph, the social networking server is tasked with coordinating the efforts of these different systems. The technical benefit of the approach disclosed herein is that it reduces the amount of human labor needed to produce a meaningful electronic presentation and eliminates the potential for errors being introduced due to operator or data-entry mistakes.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
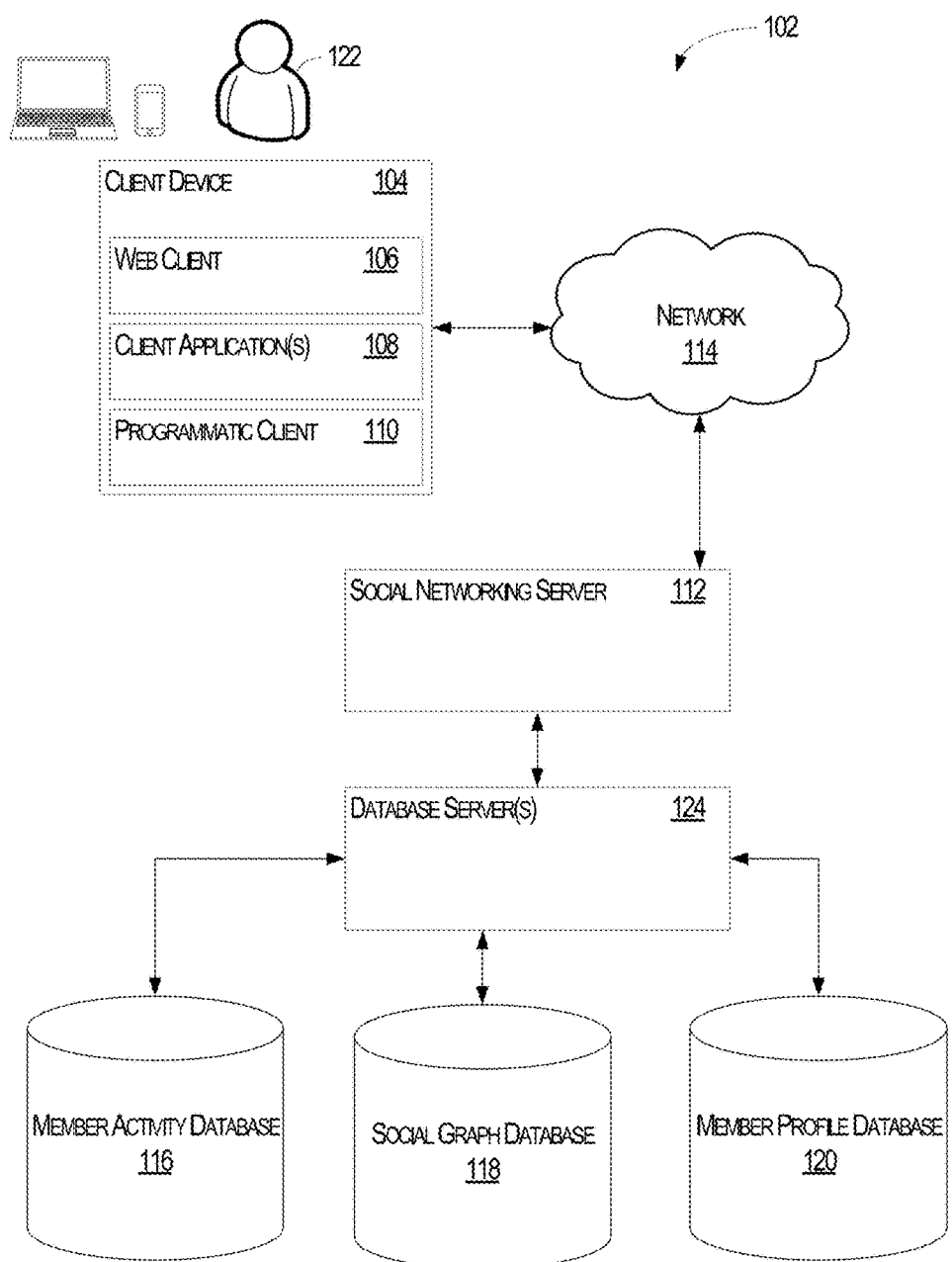
FIG. 1 is a block diagram illustrating a networked system, according to some example embodiments.

With reference to FIG. 1, an example embodiment of a high-level client-server-based network architecture 102 is shown. A social networking server 112 provides server-side functionality via a network 124 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on a client device 104. The social networking server 112 is further communicatively coupled with one or more database servers 124 that provide access to one or more databases 116-120.

The client device 104 may comprise, but is not limited to, a mobile phone, desktop computer, laptop, portable digital assistants (PDAs), smart phones, tablets, ultra books, net-books, laptops, multi-processor systems, microprocessor-based or programmable consumer electronics, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of the user 122 that is used to perform one or more searches for user profiles accessible to, or maintained by, the social networking server 112.

In one embodiment, the social networking server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 122, to identify or locate other connected members, etc.). Conversely if the social networking access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the networked system 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with other one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, one or more flat files, or combinations thereof.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, postal code, industry, interests, contact information, educational background (e.g., schools, majors, matriculation and/or graduation dates, etc.), employment history (e.g., current and/or past job titles, current and/or past employers, etc.), skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each of the members share a connection in common, but are not directly connected to one another. In one embodiment, the social graph maintained by the social networking server 112 is stored in the social graph database 118.

Although the foregoing discussion refers to "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In one embodiment, the social networking server 112 communicates with the various databases 116-120 through one or more database server(s) 124. In this regard, the database server(s) 124 provide one or more interfaces and/or services for providing content to, modifying content, removing content from, or otherwise interacting with the databases 116-120. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

While the database server(s) 124 are shown to include the social networking server 112, one of ordinary skill in the art will recognize that other servers may also be included in the database server(s) 124. For example, the database server(s) 124 may include, but are not limited to, a Microsoft® Exchange Server, a Microsoft® Sharepoint® Server, a Lightweight Directory Access Protocol ("LDAP") server, any other server configured to provide user profile information, or combinations thereof.

Figure 2:
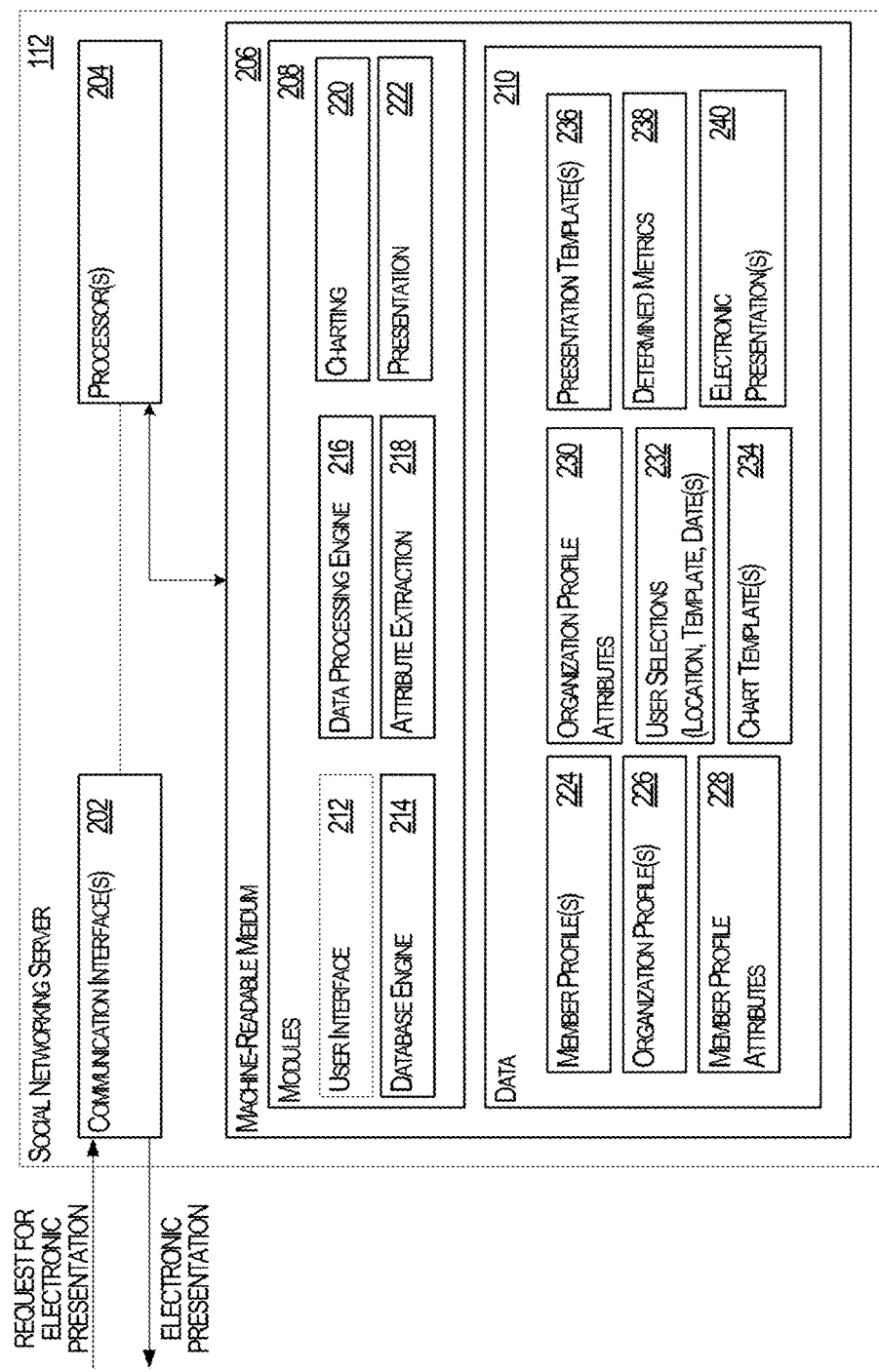
FIG. 2 illustrates the social networking server of FIG. 1, according to an example embodiment.

FIG. 2 illustrates the social networking server 112 of FIG. 1 in accordance with an example embodiment. In one embodiment, the social networking server 112 includes one or more processor(s) 204, one or more communication interface(s) 202, and a machine-readable medium 206 that stores computer-executable instructions for one or more modules(s) 208 and data 210 used to support one or more functionalities of the modules 208.

The various functional components of the social networking server 112 may reside on a single device or may be distributed across several computers in various arrangements. The various components of the social networking server 112 may, furthermore, access one or more databases (e.g., databases 116-120 or any of data 210), and each of the various components of the social networking server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the social networking server 112, the client device 104, and one or more of the database server(s) 124 and/or database(s) 116-120. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The machine-readable medium 206 includes various modules 208 and data 210 for implementing the social networking server 112. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the social networking server 112 include, but are not limited to, a user interface module 212, a database engine 214, a dated processing engine 216, an attribute extraction module 218, a charting module 220, and a presentation module 222. The data 210 referenced and used by the modules 208 include member profile(s) data 224, organization profile(s) data 226, one or more member profile attribute values 228, one or more organization profile attribute values 230, one or more received user selections 232, one or more chart templates 234, one or more presentation templates 236, and one or more determined metrics 238. The result from the processing of the data 210 includes one or more electronic presentations 240, which are communicated to the client device 104.

The user interface module 212 is configured to provide access to, and interactions with, the social networking server 112. In one embodiment, the user interface module 212 provides one or more graphical user interfaces, which may be provided using the Hypertext Transfer Protocol (HTTP). The graphical user interfaces are displayable by the client device 104 and accept input from the user 122 for interacting with the social networking server 112. Further still the user interface module 212 may be configured to provide such interfaces to one or more clients displayable by the client device 104, such as the web client 106, one or more client applications 108, or the programmatic client 110. By interacting with the user interface module 212, the user 122 can instruct the social networking server 112 to generate one or more electronic presentations 240 from various profile data (e.g., the member profile(s) data 224 and the organization profile(s) data 226) and one or more user selections 232. Further still, the user interface module 212 is configured to generate a display of the one or more electronic presentations 240 generated by the social networking server 112.

In one embodiment, the user interface module 212 provides a graphical user interface for receiving one or more of the user selections 232. The user selections 232 include, but are not limited to, a selected location, a selected template, and a date or date range from which to calculate the determined metrics 238. In alternative embodiments, the user selections may include additional or alternative selectable member attributes such as job function, industry, educational background or institutions, and other such member attributes or combination of attributes.

In one embodiment, one or more of the determined metrics 238 are determined at or near the time the user 122 requests an electronic presentation. Additionally or alternatively, one or more of the determined metrics 238 are determined at a time prior to the user 122 request for the electronic presentation. Where one or more of the determined metrics 238 are determined previously, one or more of the user selections 232 may be used to identify which of the previously determined one or more determined metrics 238 to retrieve and/or use for the requested electronic presentation.

The selected location may include a geographic location such as a state, a city, a country, or other such geographic location. The received template indicates the type of electronic presentation to communicate to the client device 104. The received template may be selected from a plurality of templates which correspond to the type of selectable locations. Thus, the templates may include a state template, the city template, a country template, or other such templates or combination of templates. The received date indicates the dates that are included within the range of the determined metrics 238. Alternatively or additionally, the received date indicates a starting date from which the determined metrics 238 are to be, or have been calculated. Where one or more of the determined metrics 238 have yet to be calculated, and the determined metrics 238 are calculated using a range of dates starting with the received date and ending with the date on which the electronic presentation is requested.

The database engine 214 is configured to provide a local database, or one or more local databases, for storing data and values used by the social networking server 112 in generating one or more requested electronic presentations 240. The local database, or one or more local databases, may be used during the creation of the electronic presentations 240 and then, upon their completion, may be erased or cleared in preparation of another set of requested electronic presentations 240. In effect, the database engine 214 provides a temporary storage location for data and attribute values used by the social networking server 112 in creating electronic presentations 240.

In one embodiment, the database engine 214 instantiates a local database for storing attribute values 228, 230 retrieved from the member profile(s) data 224 and the organization profile(s) data 226. In one embodiment, the member profile(s) data 224 and the organization profile(s) data 226 are selected according to the provided user selections 232. For example, the member profile(s) data 224 and the organization profile(s) data 226 may include a geography or location attribute, which may indicate where a given member is employed or where an organization is located. In addition, the member profile(s) data 224 and the organization profile(s) data 226 may include a date attribute, which may indicate the employment dates for a member or when an organization first established a presence at the location identified by the location attribute. By comparing the location attribute and the date attribute with the user selections 232 (e.g., the user-selected location and the user-selected), the data processing engine 216 can identify which of the member profile(s) data 224 and the organization profile(s) data 226 to select for attribute extraction and storage in the database or databases provided by the database engine 214.

Furthermore, and as discussed above with reference to FIG. 1, each of the profiles in the member profile(s) data 224 and in the organization profile(s) data 226 include various attributes having corresponding attribute values. Such values are retrieved by a data processing engine 216 (discussed below), which are then stored in the local database, or local databases, provided by the database engine 214.

In one embodiment, the retrieved attribute values correspond to parameters and/or values for which determined metrics 238 have been calculated or for which the determined metrics 238 are to be calculated. For example, and without limitation, the attributes selected for extraction from the member profile(s) data 224 may include one or more skill attributes, one or more job function attributes, one or more employment position attributes, one or more educational attributes, and other such attributes or combination of attributes. The skill attributes indicate the skills possessed by a corresponding member of the social networking service and may be self-identified or identified by other members. The job function attributes identify the type of job functions performed by a corresponding member for a corresponding position or employer. For a given position or employer, the corresponding member may identify multiple and/or different job functions. The educational attributes may include multiple different attributes such as educational institutions attended, degrees awarded or earned, organizations in which the corresponding member participated, classes taken, and other such educational attributes or combination of attributes.

With regard to the attributes for the organization profile(s) data 226, these attributes may include, but are not limited to, one or more industry attributes, one or more available job attributes, the number of employees or members of the organization, and other such attributes or combination of attributes. The industry attributes indicate one or more industries in which the organization operates, such as retail and consumer products, healthcare pharmaceuticals, professional services, and other such industries or combination of industries. The available job attributes indicates the number of job openings with a corresponding organization. Further still, a given organization profile may be associated with a number of job opening advertisements hosted by the social networking service. Thus, by referencing the job opening advertisements, the social media server 112 can determine the number of job openings available at the corresponding organization. Finally, the number of employees for a given organization may be provided by the organization itself (e.g., included in the organization profile(s) data 226) or may be determined from the member profile(s) data 224. Alternatively, and as discussed below, the social networking server 112 may leverage outside sources of information, via one or more communication interfaces 202, to obtain the number of employees for a given organization or an estimated number of employees for the organization.

The foregoing attributes for the member profile(s) data 224 and the organization profile(s) data 226 are provided by way of example. In alternative embodiments, the member profile(s) data 224 and the organization profile(s) data 226 may include alternative, additional, or fewer attributes. As discussed below with reference to FIGS. 4-13, these attributes are leveraged by the charting module 220 and the presentation module 222 in selecting various metrics 238 (e.g., where the determined metrics 238 were previously determined) or in determining various metrics 238 (e.g., where the determined metrics 238 have not yet been determined) and generating the electronic presentation(s) 240.

Referring back to the database engine 214, the database engine 214 may be implemented as a relational database management system, a hierarchical database management system, a file manager for managing one or more flat files, or other such database management system. As one example, the database engine 214 is implemented as MySQL, which is an open-source relational database management system available from the Oracle Corporation. Although this disclosure contemplates storing the member profile attribute values 228 and the organization profile attributes values 230 in the database, or databases, provided by the database engine 214, other data may be stored in those databases as well. For example, the social networking server 112 may store one or more received user selections 232, the determined metrics 238, and the generated electronic presentations 240 in the local database or local databases. As discussed below, other data 210, such as the chart template(s) 234 and the presentation template(s) 236, may reside in databases communicatively coupled to the social networking server 112.

The database engine 214 instantiates the local database, or one or more local databases, to facilitate faster access to the retrieved member profile attribute values 228 and the retrieved organization profile attribute values 230. In other words, having a local database, or one or more local databases, accessible by the social networking server 112 ensure that various modules of the social networking server 112 do not have to constantly retrieve such values from the databases 116-120. This feature reduces the amount of perceived lag time from when a request for an electronic presentation was received to the transmission of such electronic presentation.

The data processing engine 216 is configured to retrieve data from one or more the databases 116-120 and to process such retrieved data. In one embodiment, the data processing engine 216 cooperates with the database engine 214 to store various values in a database, or databases, local to the social networking server 112. The data processing engine 216 may be implemented as a large-scale computing framework and/or architecture. For example, and in one embodiment, the data processing engine 216 is implemented as Apache Spark™, which is available from the Apache Software Foundation. As known to one of ordinary skill in the art, Apache Spark™ is an open-source cluster computing framework that includes various modules and APIs for streaming, Structured Query Language (SQL), machine learning and graph processing. Further still, and in one embodiment, the data processing engine 216 is configured to retrieve data from one or more of the databases 116-120 including, but not limited to, one or more member profiles from the member profile database 120, one or more organizational profiles from the member profile database 120, and one or more social graphs from the social graph database 118.

In addition, the data processing engine 216 is configured to invoke an attribute extraction module 218 to extract one or more attribute values from the member profile(s) data 224 and the organization profile(s) data 226, which are stored as the member profile attribute values 228 and the organization profile attribute values 230, respectively. In one embodiment, the attribute extraction module 218 accepts as input identified attributes from the member profile(s) data 224 and the organization profile(s) data 226, and then communicates the extracted attribute values to the data processing engine 216. In turn, the data processing engine 216 communicates with the database engine 214 to store the extracted attribute values. In one embodiment, the attributes provided as input to the attribute extraction module 218 are selected according to the metrics to be determined (e.g., the determined metrics 238) and included in the generated electronic presentations 240.

The charting module 220 is configured to generate one or more charts according to the determined metrics 238 and the chart template(s) 234. In one embodiment, the charting module 220 is implemented as an API to a Tableau server, and the social networking server 112 invokes the charting module 220 to pass various function calls and attributes to the Tableau server. A Tableau server is available from Tableau Software, which is located in Seattle, Wash.

Using the charting module 220, the social networking server 112 may create one or more chart templates that define the type of chart to be created and the data to use in creating the chart. Examples of such charts include bar charts, line charts, regression charts, horizontal bar charts, line charts, multidimensional charts, or any other such charts. For example, and as used in this disclosure, a first chart template may define that a bar chart is to be created using one or more skill attribute values for the x-axis and industry attribute values for the y-axis. As another example, a second chart template may define that a circular chart is to be created where the attribute values are selected from the organization profile attributes 230, such as the number of employees at one or more organizations and the amount of revenue generated by the one or more organizations. Thus, a chart template includes a definition for the chart type and the values to use in creating the chart. As the Tableau server may be unaware of what the attribute values represent, the chart templates serve to provide context to the values as they are communicated to the Tableau server.

In addition to communicating the member profile attribute values 228 and the organization profile attribute values 230, the charting module 220 may facilitate a determination or selection of various metrics 238 derived from the member profile attribute values 228 and the organization profile attribute values 230. In this regard, the Tableau server may be configured with various statistical equations, where one or more of the member profile attribute values 228 and/or one or more of the organization profile attribute values 230 can be mapped to the variables of the statistical equations. For example, a statistical equation may determine the uniqueness of a given member skill or set of member skills for a location defined by the user-selected location. In this regard, the skill attribute values from the member profile attribute values 228 are passed to the charting module 220, which then maps the skill attribute values to the variables used in determining the uniqueness of each skill from the collection of skill attribute values.

Accordingly, in this example, the result may be a chart, as defined by a chart template 234, that identifies which of the skills from the collection of skill attribute values are unique to the user-selected location. In this manner, one of ordinary skill in the art will recognize that Tableau server and/or the charting module 220 may be configured with various statistical equations that, when executed, provide an output which can be mapped to a variable of a chart defined by chart template(s) 234. Thus, the charting module 220 is not limited in providing charts relating to the member profile attribute values 228 or the organization profile attribute values 230, but can also provide charts for metrics 238 determined from these values 228, 230.

Finally, the presentation module 222 is configured to assemble the determined charts provided by the charting module 220. In one embodiment, the presentation module 222 is implemented as an API or other communication interface to the Tableau server. Further still, the presentation module 222 leverages presentation template(s) 236, where a presentation template(s) 236 defines the order in which charts should appear that have been determined by the charting module 220. In one embodiment, the presentation template(s) 236 are designed as Microsoft PowerPoint presentation templates, and the resulting output from the presentation module 222 is a Microsoft PowerPoint presentation. As known to one of ordinary skill in the art, a Microsoft PowerPoint presentation comprises one or more electronic documents (e.g., "slides"). In one embodiment, each electronic documents of a presentation template(s) 236 defines various electronic document attributes that provide the overall look-and-feel of the electronic presentation. For example, the electronic document attributes may include, but are not limited to, the text that is to appear on an electronic document, the size of the text, the font to use for the text, the color of the font, the type of chart to be presented, the location and/or size of the chart to be presented, and other such electronic document attributes or combination of attributes.

Like the mapping between the profile attribute values 228, 230 and the chart template(s) 234, a mapping may also be defined between the determined charts and their location to be displayed within a presentation template(s) 236. In this manner, each electronic document within a presentation template(s) 236 is configurable as to the type of chart displayed. Thus, when the presentation module 222 is invoked to create a particular presentation selected from the presentation template(s) 236, the presentation module 222 may retrieve one or more of the charts determined by the charting module 220 to place within one or more of the electronic documents of the selected presentation template(s) 236.

In one embodiment, the selectable presentation template(s) 236 are displayed via the user selections 232. Thus, for each available presentation template type, there may be a corresponding user selection 232 for the available presentation template(s) 236. In this manner, a user can choose the type of electronic presentation to create according to the available presentation template(s) 236. When the electronic presentation is created and stored (e.g., as electronic presentation(s) 240), the electronic presentation(s) 240 may then be communicated to the client device 104 via one or more communication interfaces 202.

Figure 3:
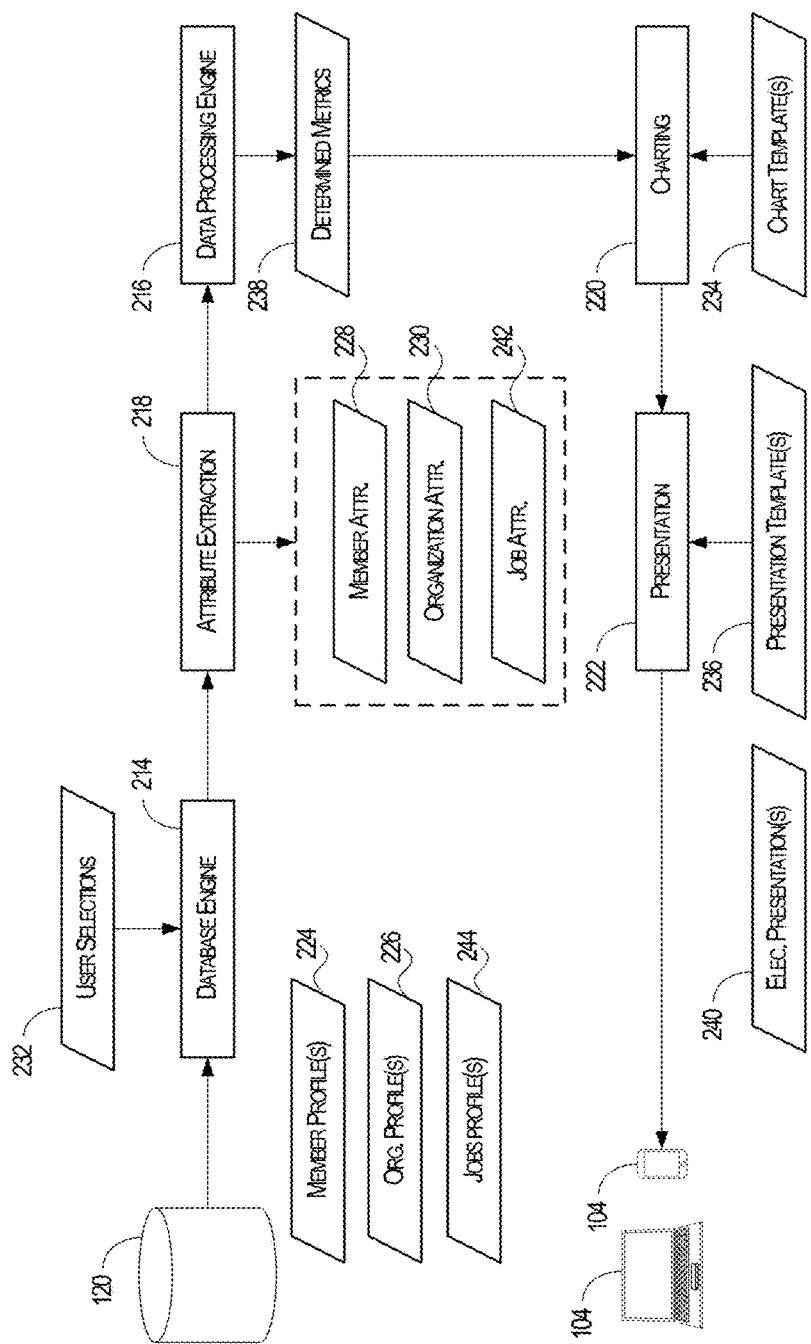
FIG. 3 illustrates an example of automatically generating an electronic presentation using the social networking server of FIG. 1, according to an example embodiment.

FIG. 3 illustrates an example of automatically compiling an electronic presentation using the social networking server 112 of FIG. 1, according to an example embodiment. While FIG. 3 illustrates that the generation of the electronic presentation(s) 240 occurs in a particular manner, one of ordinary skill in the art will appreciate that various steps and/or operations may be performed in a different order or may be omitted or substituted for different operations without departing from the scope and concept of this disclosure.

As shown in FIG. 3, the database engine 214 selects member profile(s) data 224, organization profile(s) data 226, and job profile data 244 from the member profile database 120 according to one or more user provided selections 232. As explained previously, the user selections 232 may include a location selection that identifies a geographic location to be used, and the member profile(s) data 224, organization profile(s) data 226, and job profile(s) data 244 are selected according to a location attribute matching or associated with the location selection.

Having selected and/or identified one or more member profiles from the member profile(s) data 224, one or organization profile from the organization profile(s) data 226, and one or more job profile(s) data 244, the attribute extraction module 218 then extracts one or more profile attribute values 228, 230 from the selected member profiles, the selected job profiles, and a selected organization profile, respectively. In one embodiment, and as discussed above, the member profile attribute values 228 and the organization profile attribute values 230 are selected according to the parameters used to determine or select one or more metrics 238. One of ordinary skill in the art will recognize that the member attribute values 228, the organization attribute values 230, and the job attribute values 242 may be defined by various combinations of attributes from the member profiles 224, the organization profiles 226, and the job profiles 244, such that the member profile database 120 may include various combinations of the different types of profiles.

The metrics 238 to be determined or selected may be identified according to the presentation template(s) 236 selected by the user. This is because the presentation template(s) 236 identifies selected ones of the chart template(s) 234 to be included in the generated electronic presentation(s) 240, and a chart template(s) 234 identifies the attributes that are to be included in the chart defined by the chart template(s) 234. Thus, while the user does not select the individual member profile attribute values 228, the organization profile attribute values 230, and the job profile attribute values 242, to be included in the electronic presentation(s) 240, the templates that make up the electronic presentation(s) 240 identify such attribute values 228, 230, 242. In effect, the user selections 232 indirectly identify the member profile attribute values 228, the organization profile attribute values 230, and the job profile attribute values 242 that are to be extracted by the attribute extraction module 218.

The extracted member profile attribute values 228, the extracted organization profile attribute values 230, and the extracted job profile attribute values 242 are leveraged by the data processing engine 216 to determine one or more of the metrics 238. The various metrics 238 are discussed with reference to FIGS. 4-13. In one embodiment, the determined metrics 238 may vary according to the chart defined by a given chart template 234 assigned to a particular electronic document (e.g., a slide of an electronic presentation 240). Furthermore, such metrics 238 may vary among a collection of electronic presentations 240. As explained above, the data processing engine 216 and/or the charting module 220 may be preconfigured with one or more statistical equations for determining the metrics 238 and such statistical equations are referenced by the data processing engine 216 and/or the charting module 220 when the charts are being generated for the selected electronic presentation. Additionally, and/or alternatively, one or more of the determined metrics 238 may have been previously determined prior to the request for the electronic presentation, in which case, the charting module 220 retrieves such previously determined metrics 238 for inclusion at one or more designated locations as defined by the chart template 234.

The determined metrics 238 are then graphically depicted in one or more selected chart templates 234 by the charting module 220. In addition, the charting module 220 may graphically depict one or more of the extracted attributes 228, 230, 242 depending on the chart being generated for an electronic document of a selected presentation template 236. In one embodiment, the charting module 220 is configured with very statistical relationships and/or equations for graphically depicting relationships among the member profile attribute values 228, the organization profile attribute values 230, and the job profile attribute values 242. For example, relationships may include the uniqueness of a particular attribute value 228, 230, 242, rankings of particular attribute values 228, 230, 242, distributions of particular attribute values 228, 230, 242, changes in one or more attribute values 228, 230, 242, and other such relationships.

The charts prepared by the charting module 220 are then incorporated into a selected presentation template 236 by the presentation module 222. In one embodiment, the presentation module 222 and the charting module 220 communicate with the Tableau server, as discussed above, and incorporate the output of the Tableau server into a transmission to the client device 104. In this manner, the Tableau server performs one or more statistical operations on the attribute values 228, 230, 242 and/or the determined metrics 238, which are then incorporated as charts according to the chart template(s) 234 assigned to a given presentation template 236. As an electronic document from a presentation template 236 is completed, the electronic document is incorporated into an electronic presentation 240 transmission and/or display by the client device 104. In this manner, the presentation module 222 handles the assembly and/or transmission of the electronic presentation(s) 240 requested by the client device 104.

Figure 4:
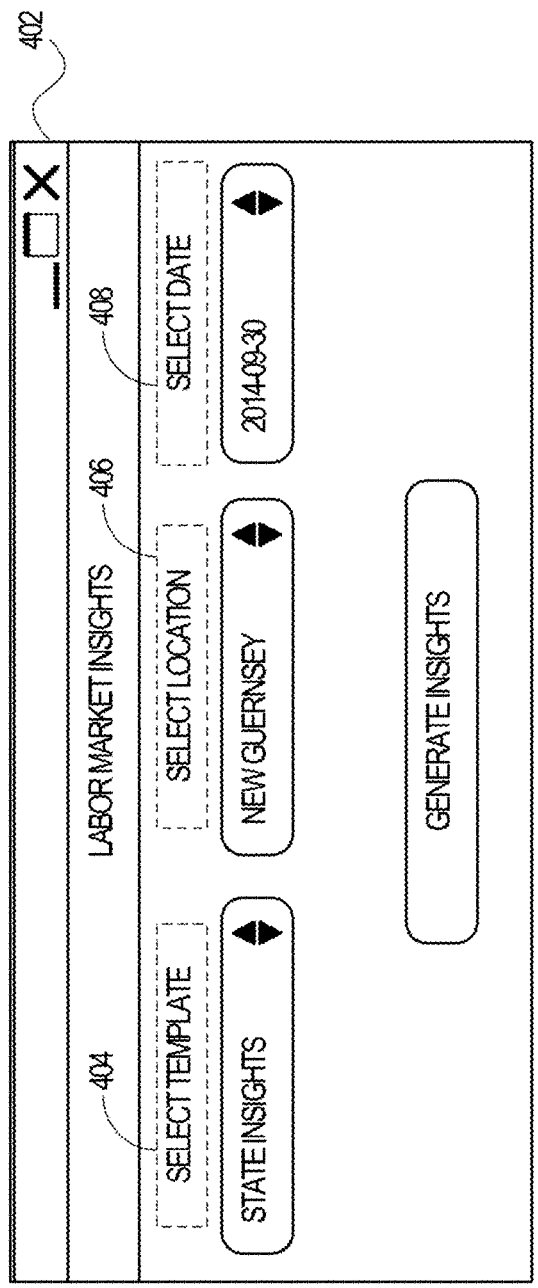
FIG. 4 illustrates a graphical user interface, according to an example embodiment, for selecting different options for automatically generating an electronic presentation using obtained economic data.

FIG. 4 illustrates a graphical user interface 402, according to an example embodiment, for selecting various options 404-408 for automatically generating an electronic presentation. The various options 404-408 correspond to the user selections 232 discussed with reference to FIG. 2. As shown in FIG. 4, the selectable options 404-408 include a template option 404, a location option 406, and a date option 408. In one embodiment, the template option 404 displays selectable types of electronic presentations that the user 122 or client device 104 may request. The template option 404 corresponds to one or more of the presentation templates 236. The options 404-408 represent labor market options for obtaining information about a particular market represented by the options 404-408.

The location option 406 corresponds to the geographic locations for identifying one or more of the member profiles from member profile(s) data 224 and one or more of the organization profiles from organization profile(s) data 226 to include in the selected electronic presentation 240. For example, as shown in FIG. 4 by selecting "New Guernsey" as the location option 406, the social networking server 112 generates an electronic presentation for member profiles and organization profiles associated with the fictional state of New Guernsey. In one embodiment, one or more of the member profiles and/or one or more of the organization profiles may not include an attribute having the value of New Guernsey, but instead may include in attribute having a value associated with the fictional state of New Guernsey. For example, one or more of the profiles from data 224, 226 may include a city attribute having a value of the city known to be within the fictional state of New Guernsey. In this example, the social networking server 112 via the database engine 214 and/or the data processing engine 216 identifies profiles from data 224, 226 having a city value known to be within the fictional state of New Guernsey (e.g., by performing a look-up on a table of cities cross-referenced with states).

The date option 408 lists the dates that the user 122 and/or client device 104 may select in generating an electronic presentation 240. In one embodiment, the selected date option 408 forms a lower boundary for using member profile attribute values 228 and organization profile attribute values 230. For example, the selected date option 408 may limit the amount of employment history (e.g., employment history attribute values) that the charting module 220 uses in calculating various metrics 238. As another example, the selected date option 408 may limit the amount of growth history (e.g., organization attribute values) that the charting module 220 uses in determining various metrics 238 for the selected organization profiles. In an alternative embodiment, the selected date option 408 forms an upper boundary on the member profile attribute values 228 and the organization profile attribute values 230. The options 404-408 that are selected are stored by the social networking server 112 as the user selections 232, which are then referenced by the various modules (e.g., the charting module 220 and/or the presentation module 222) in preparing one or more charts for the selected electronic presentation 240.

FIGS. 5-13 illustrate various electronic documents included in a generated electronic presentation, according to an example embodiment. Each of the electronic documents illustrated in FIGS. 5-13 may be classified into an economic category. An economic category is a category that relates to the economy of the geographic location selected by the user and/or client device 104. In one embodiment, the economic categories include a "Workforce" category, a "Hiring" category, an "Education" category, a "Migration" category, and a "Comparisons" category. The Workforce category includes information about the workforce for an organization or a selected geographic location. The Hiring category includes information about the employment of members for one or more organizations and/or a selected geographic location. The Education category includes information about the education of members for one or more organizations and/or selected geographic location. The Migration category includes information about how members of one or more organizations and/or a geographic location have migrated to and/or from other places (e.g., other geographic locations or other organizations). Finally, the Comparisons category includes information about how members of one or more organizations and/or a geographic location rank against members in other organizations and/or a geographic location.

Figure 5:
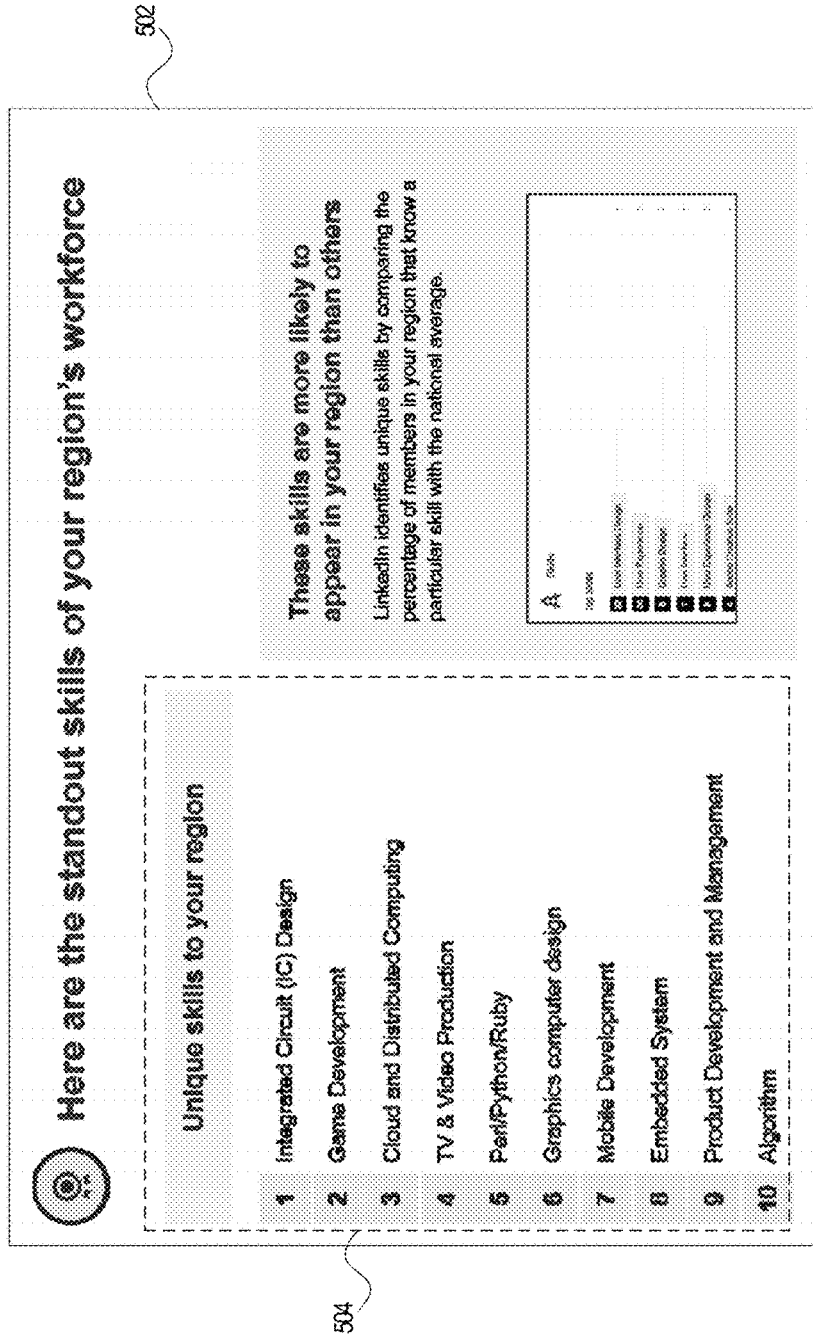
FIGS. 5-14 illustrate various electronic documents included in a generated electronic presentation, according to various example embodiments.
Figure 6:
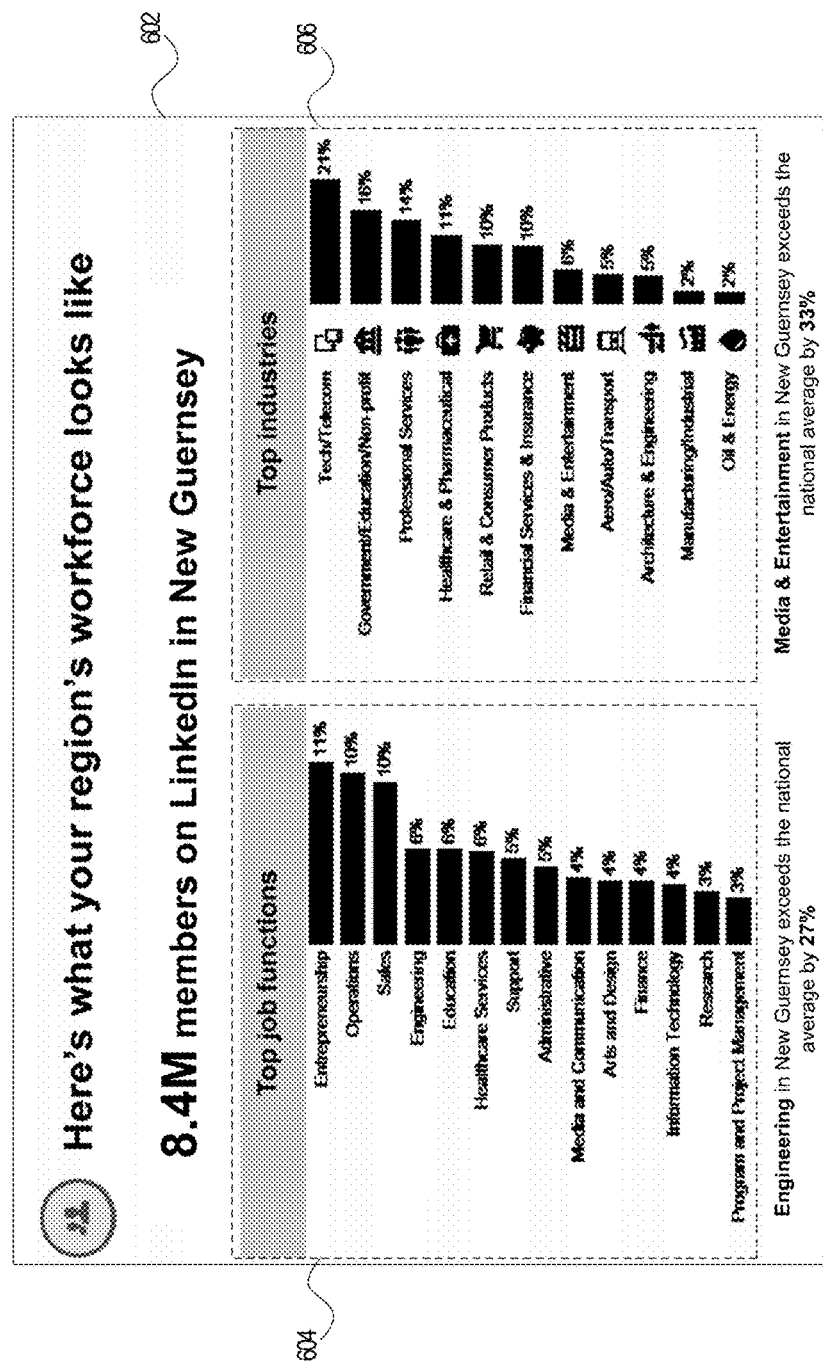

FIGS. 5-6 illustrate electronic documents 502, 602 that present information in the Workforce economic category. Referring to FIG. 5, an illustration of an electronic document 502 includes a chart 504 generated from a corresponding chart template (e.g., chart template(s) 234). In one embodiment, the selected chart template defines a list chart and the charting module 220 uses a set of determined unique skills as elements for the list chart. As shown in FIG. 5, the chart 504 includes a listing of skills obtained by the attribute extraction module 218 from one or more skill attribute values from the member profile attribute values 228. Furthermore, the electronic document 502 includes a brief description of the manner in which the chart 504 was generated. The chart 504 may be considered one type of chart (e.g., a ranked listing chart) that is included in the electronic presentation 240 to be communicated to the client device 104.

Referring to FIG. 6, an illustration of an electronic document 602 includes a first chart 604 and second chart 606 derived from the member profile attribute values 228. The first chart 604 includes a listing of the top job functions derived from job function attribute values associated with the one or more selected member profiles from member profile(s) data 224. Similarly, the second chart 606 includes a listing of the top industries derived from industry attribute values associated with the one or more selected member profiles from member profile(s) data 224. In one embodiment, the first chart 604 and the second chart 606 are generated by analyzing the distribution of values assigned to the job function attribute and the distribution of values assigned to the industry attribute, and then identifying those values which appear more frequently than other values assigned to the same corresponding attribute. In one embodiment, the first chart 604 and the second chart 606 correspond to a horizontal bar chart template, which defines another type of chart.

Figure 7:
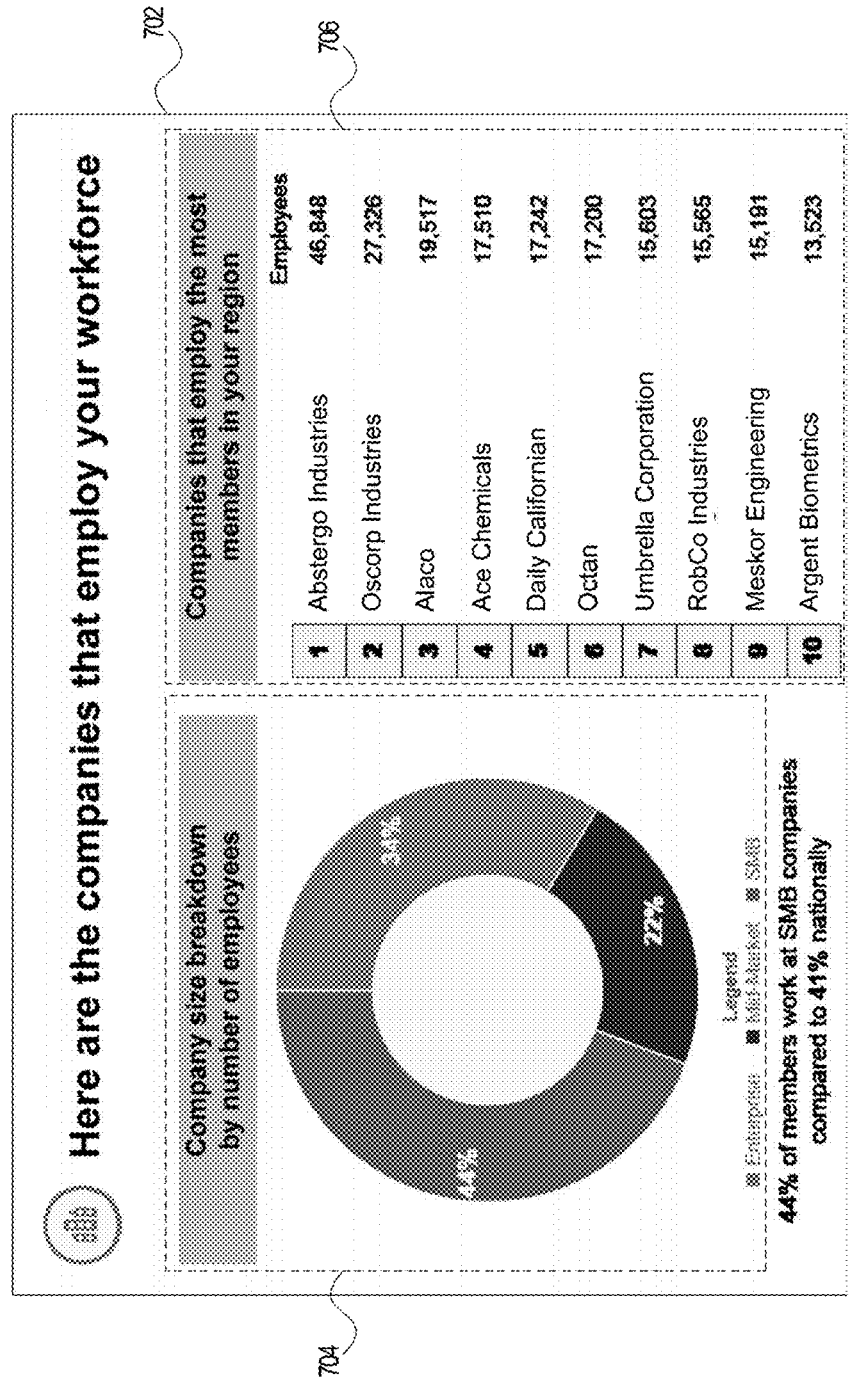
Figure 8:
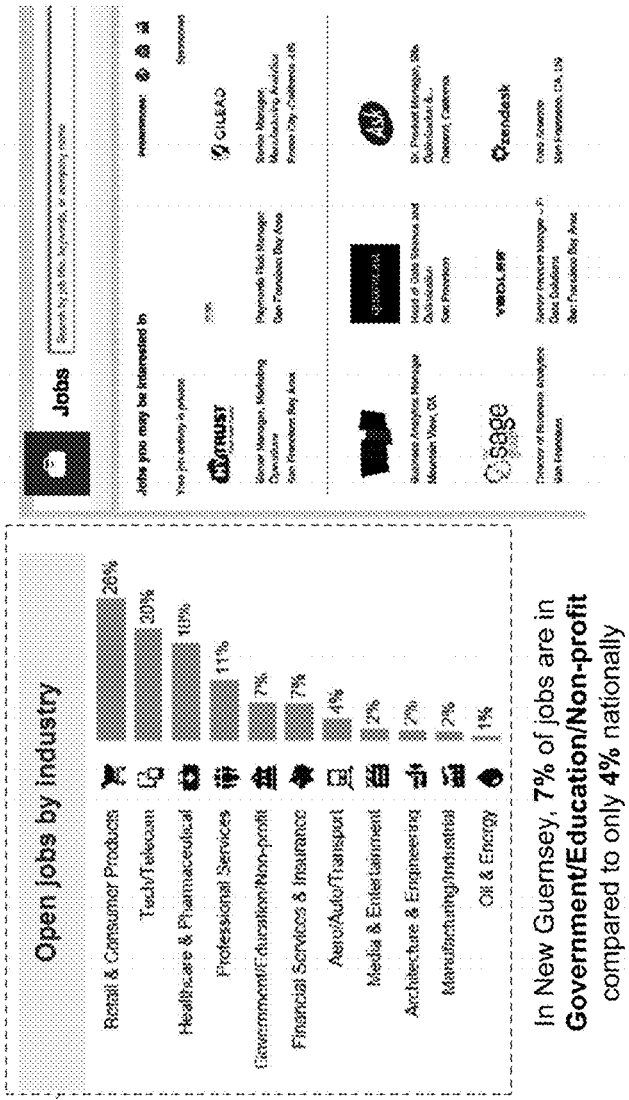
Figure 9:

FIGS. 7-9 illustrate electronic documents 702, 802, 902 that present information in the Hiring economic category. Referring first to FIG. 7, an illustration of an electronic document 702 includes a first chart 704 and second chart 706 derived from the organization profile attribute values 230 and member profile attribute values 228. In particular, the first chart 704 may be generated by analyzing an employer attribute value associated with each of the selected member profiles over the date range specified by the date option 408 of FIG. 4. The second chart 706 may be prepared similarly except that the individual organizations may be identified, rather than be categorized into a particular grouping defined by an upper and/or lower range of a number of employees.

The first chart 704 represents a circular chart where the elements of the chart include grouping of the organizations represented by the selected organization profiles of organization profile(s) data 226. The first chart 704 is an example of yet another chart type defined by the chart template(s) 234 (e.g., a circular chart). The second chart 706 illustrates another implementation of the ranked listing chart type, where the elements of the chart are the individual organizations represented by the selected organization profiles.

FIG. 8 is an illustration of an electronic document 802 that includes a chart 804 derived from the organization profile attribute values 230. In particular, the chart 804 may be generated by analyzing job postings submitted by the organizations associated with the selected organization profiles and correlating the job postings with one or more industry attribute values associated with the corresponding selected organization profiles. As discussed above, such analysis may be performed by the charting module 220 and/or a Tableau server communicatively coupled to the social networking server 112 via the charting module 220. The chart 804 is an example of another horizontal bar chart type defined by a chart template selected from the chart template(s) 234.

FIG. 9 is an illustration of an electronic document 902 that includes a chart 904 derived from the member profile attribute values 228 for a specified time period (e.g., one year). The specified time period may be computed using the date option 408 of FIG. 4, where the date option 408 may form the upper or lower boundary of the specified time period.

In one embodiment, the chart 904 is generated from a correlated analysis that includes identifying which of the selected member profiles (of member profile(s) data 224) include a new or changed employment history attribute value (e.g., a new job position, a changed job position, a new organization, a changed organization, etc.) over the specified time period. Thereafter, one or more skill attribute values are then extracted from the identified member profiles and aggregated to generate the chart 904 illustrated in FIG. 9. The chart 904 illustrates yet another implementation of a ranked listing chart, where the elements of the chart 904 are determined from one or more skill attribute values and one or more employment history attribute values.

Figure 10:
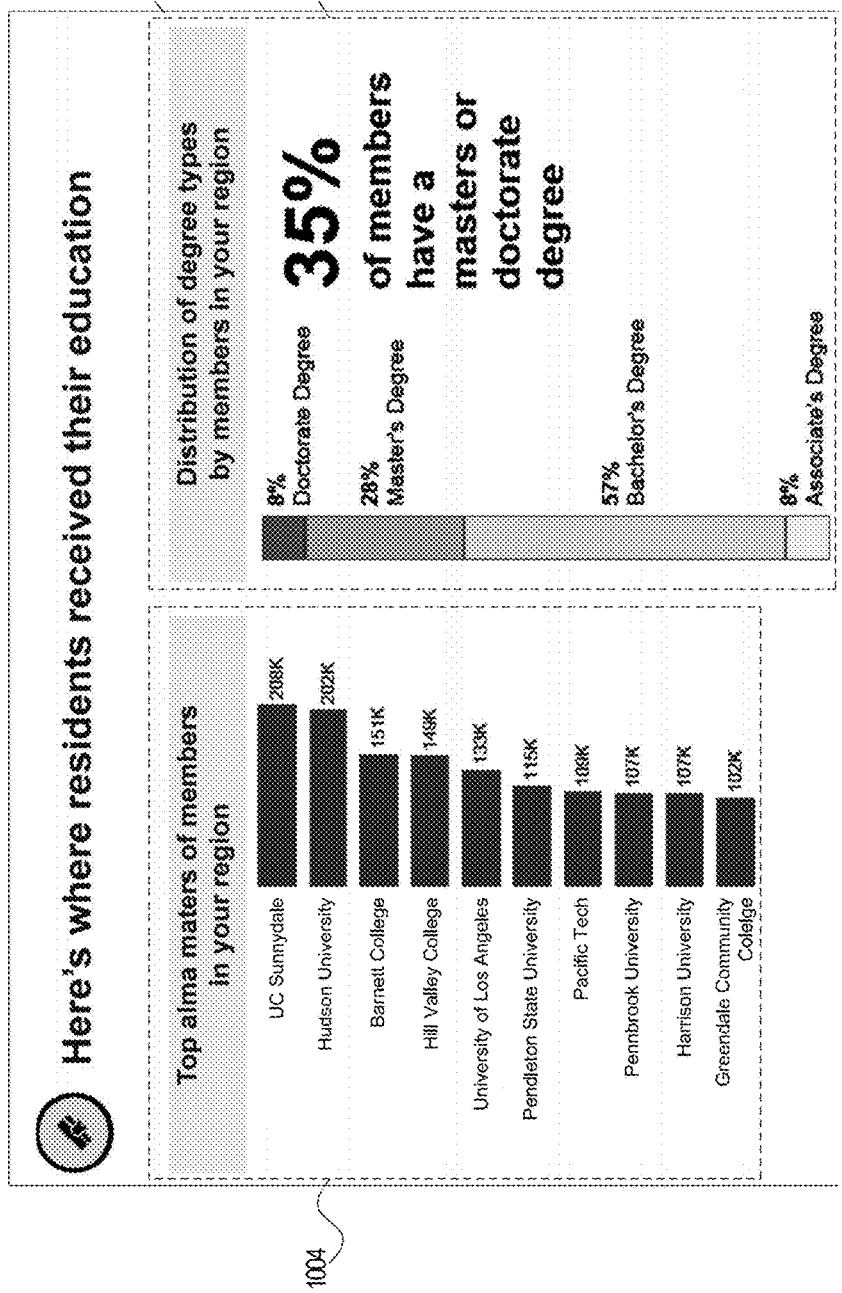
Figure 11:
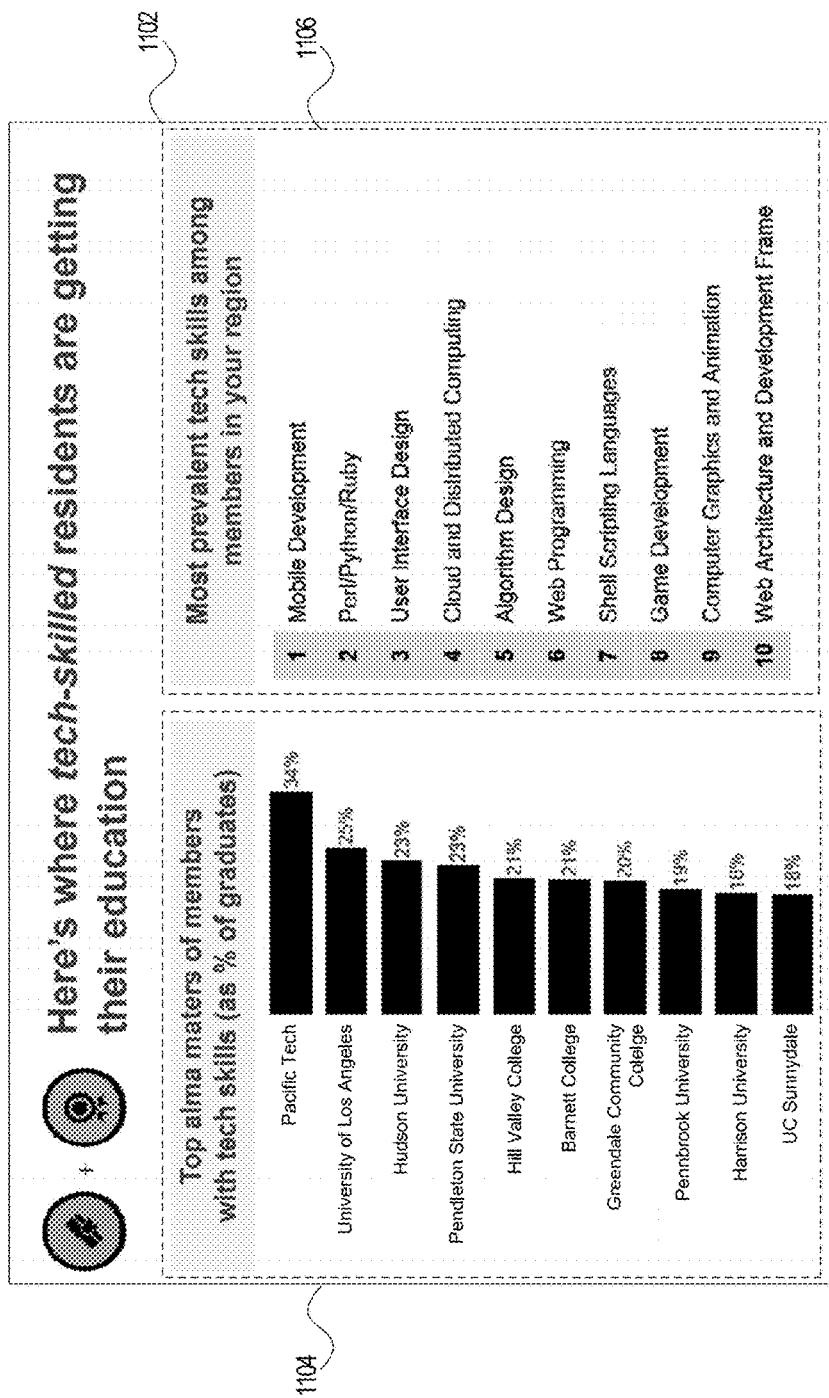

FIGS. 10-11 illustrate electronic documents 1002, 1102 that present information in the Education economic category. FIG. 10 is an illustration of an electronic document 1002 that includes a first chart 1004 and second chart 1006 derived from the member profile attribute values 228. In particular, the charts 1004, 1006 may be generated from one or more educational attribute values associated with the selected member profiles. In one embodiment, the educational attribute values include one or more past educational institutions attended and one or more educational degrees awarded. Accordingly, the chart 1004 is generated from the educational institutions listed as being past educational institutions for each of the selected member profiles. The chart 1006 is similarly generated, and uses the educational degrees identified as being awarded for each of the selected member profiles. The chart 1004 is another example of a horizontal bar chart whereas the chart 1006 is an example of a vertical bar chart created from a vertical bar chart template selected from the chart template(s) 234.

FIG. 11 is an illustration of an electronic document 1102 that includes a first chart 1104 and second chart 1106 derived from the member profile attribute values 228. In particular, the charts 1104, 1106 may be generated from the one or more educational attribute values associated with the selected member profiles and the one or more skill attribute values associated with the selected member profiles. As discussed above with reference to FIG. 10, the educational attribute values include one or more past educational institution attended and one or more educational degree awarded. Accordingly, the chart 1104 is generated by correlating the educational institutions listed as being past educational institutions for each of the selected member profiles and the attribute skill values associated with corresponding selected member profiles. The chart 1106 is similarly generated, and uses the skill attribute values associated with each of the selected member profiles. The chart 1104 is a further example of a horizontal bar chart and the chart 1106 is another example of a ranked listing chart.

Figure 12:
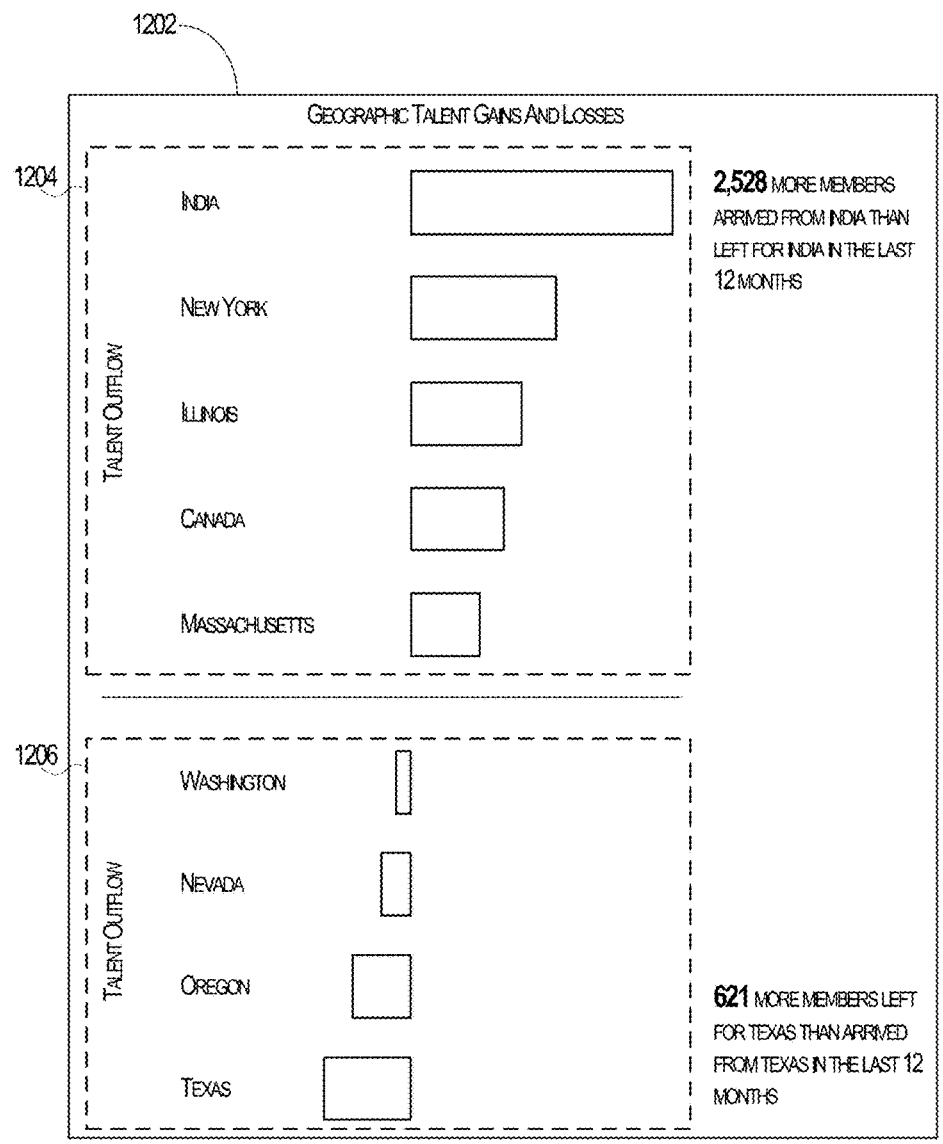
Figure 13:
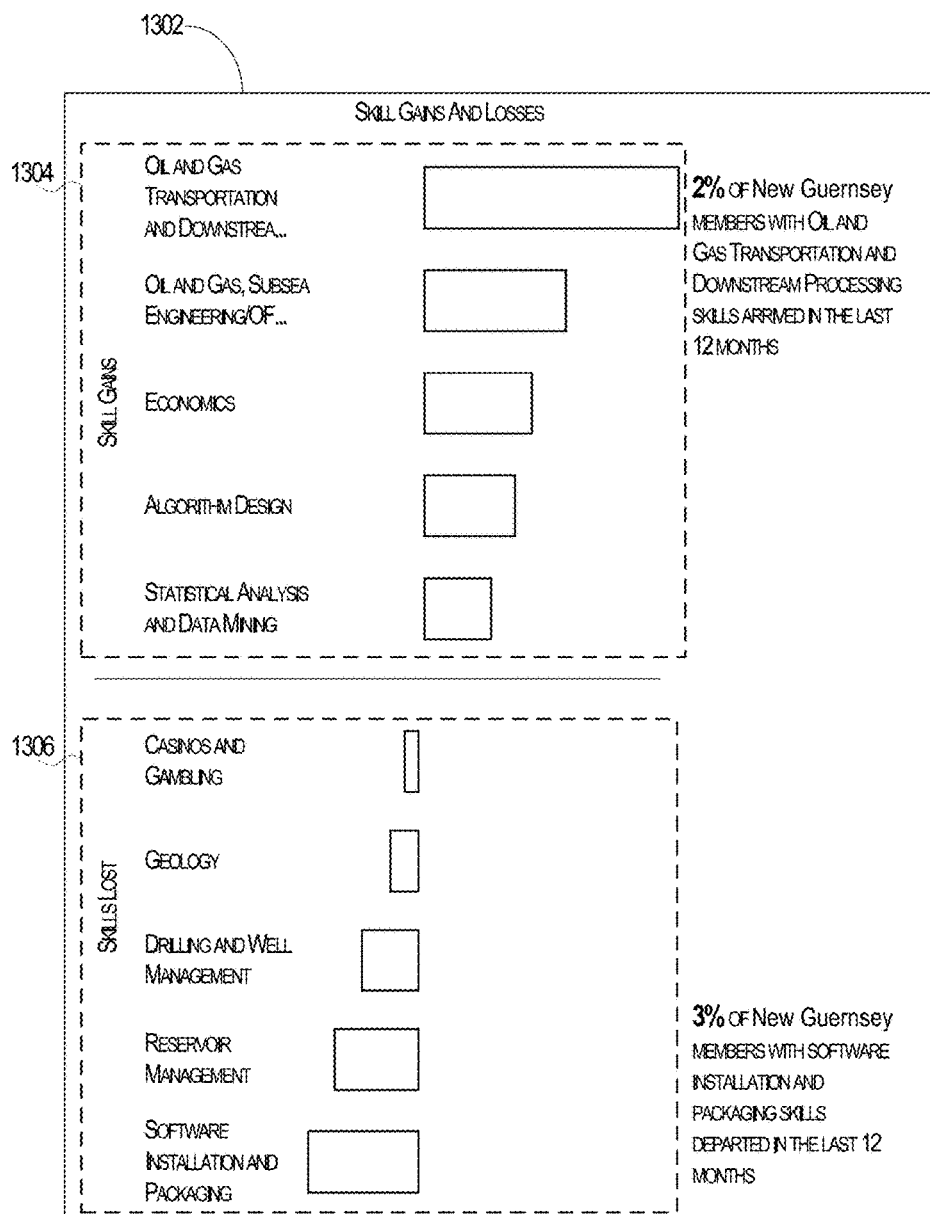
Figure 14:
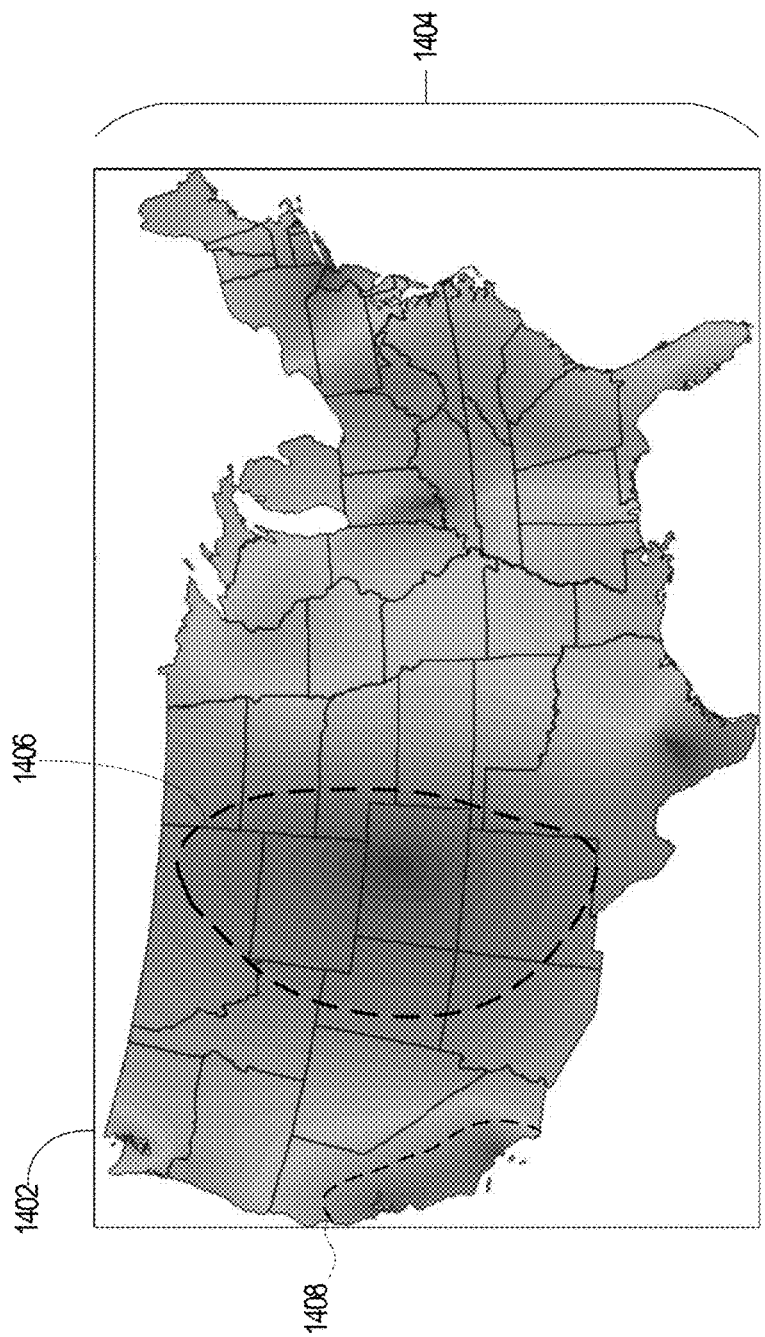

FIGS. 12-14 illustrate electronic documents 1202, 1302, 1402 that present information in the Migration economic category. FIG. 12 is an illustration of an electronic document 1202 that includes a first chart 1204 and second chart 1206 derived from the member profile attribute values 228 within a specified time period (e.g., one year). In particular, the charts 1204, 1206 may be generated from one or more location attribute values associated with the selected member profiles of member profile(s) data 224. In one embodiment, the charts 1204, 1206 are generated from a correlated analysis that includes identifying which of the selected member profiles include a new or changed location attribute value over the specified time period. The chart 1204 indicates that more people arrived from a designated location (e.g., "India") than left for that designated location (e.g., there was a net inflow from the designated location) relative to the location selected by the user 122 and/or client device 104 (e.g., the selected location option 406 of FIG. 4). The chart 1206 indicates that more people left for a designated location (e.g., "Texas") than arrived for that designated location (e.g., there was a net outflow to the designated location) relative to the location selected by the user 122 and/or client device 104. The charts 1204, 1206 are further examples of a horizontal bar chart.

FIG. 13 is an illustration of an electronic document 1302 that includes a first chart 1304 and second chart 1306 derived from the member profile attribute values 228 within a specified time period (e.g., one year). In particular, the charts 1304, 1306 may be generated from one or location attribute values associated with the selected member profiles. In one embodiment, the charts 1304, 1306 are generated from a correlated analysis that includes identifying which of the selected member profiles include a new or changed location attribute value over the specified time period. After identifying these selected member profiles, a further analysis is performed to extract one or more skill attribute values from the identified member profiles. The extracted one or more skill attribute values are then grouped (e.g., via a correlated look-up table or the like) into sets, which are then presented in the charts 1304, 1306. As shown in FIG. 13, chart 1304 presents those skill sets that are associated with members who have arrived from outside the location selected by the user 122 and/or client device 104 (e.g., the selected location option 406 of FIG. 4). The chart 1306 presents those skill sets that are associated with members who have departed from the location selected by the user 122 and/or client device 104. The charts 1204, 1206 are yet further examples of a horizontal bar chart.

FIG. 14 is an illustration of an electronic document 1402 that includes a chart 1404 derived from the member profile attribute values 228 within a specified time period (e.g., one year). In particular, the chart 1404 may be generated from one or location attribute values associated with the selected member profiles. In one embodiment, the chart 1404 is generated from a correlated analysis that includes identifying which of the selected member profiles include a new or changed location attribute value over the specified time period. After identifying these selected member profiles, a further analysis is performed to determine the difference in the change (e.g., a comparison of the new or changed location attribute value with the old or prior location attribute value). As shown in FIG. 14, the chart 1404 presents a distribution of locations (e.g., location 1406 and location 1408) where the change has been the greatest (e.g., exceeded a preconfigured threshold). The chart 1404 is one example of a heatmap type chart that may be defined by one or more of the chart templates 234.

Figure 15A:
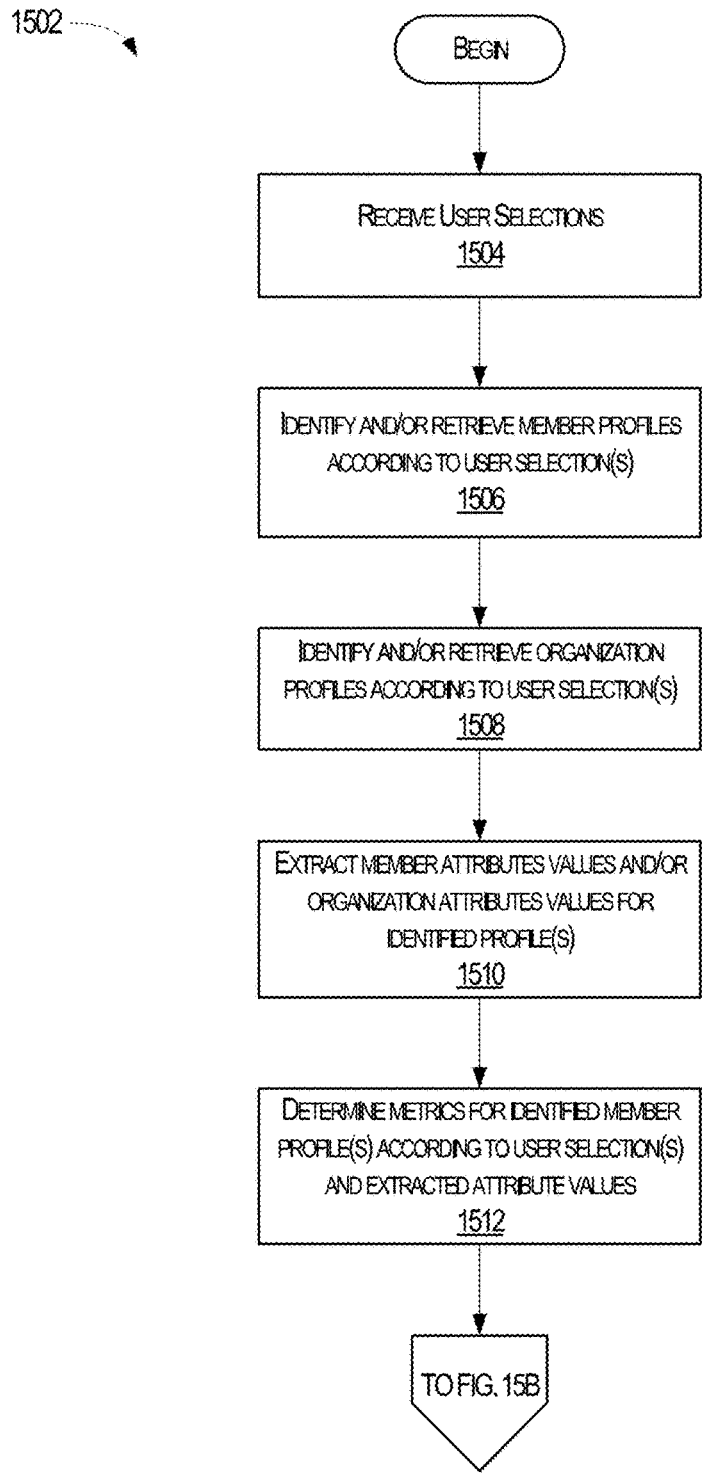
FIGS. 15A-15B illustrate a method, according to an example embodiment, for generating a requested electronic document leveraging economic data, according to an example embodiment.
Figure 15B:
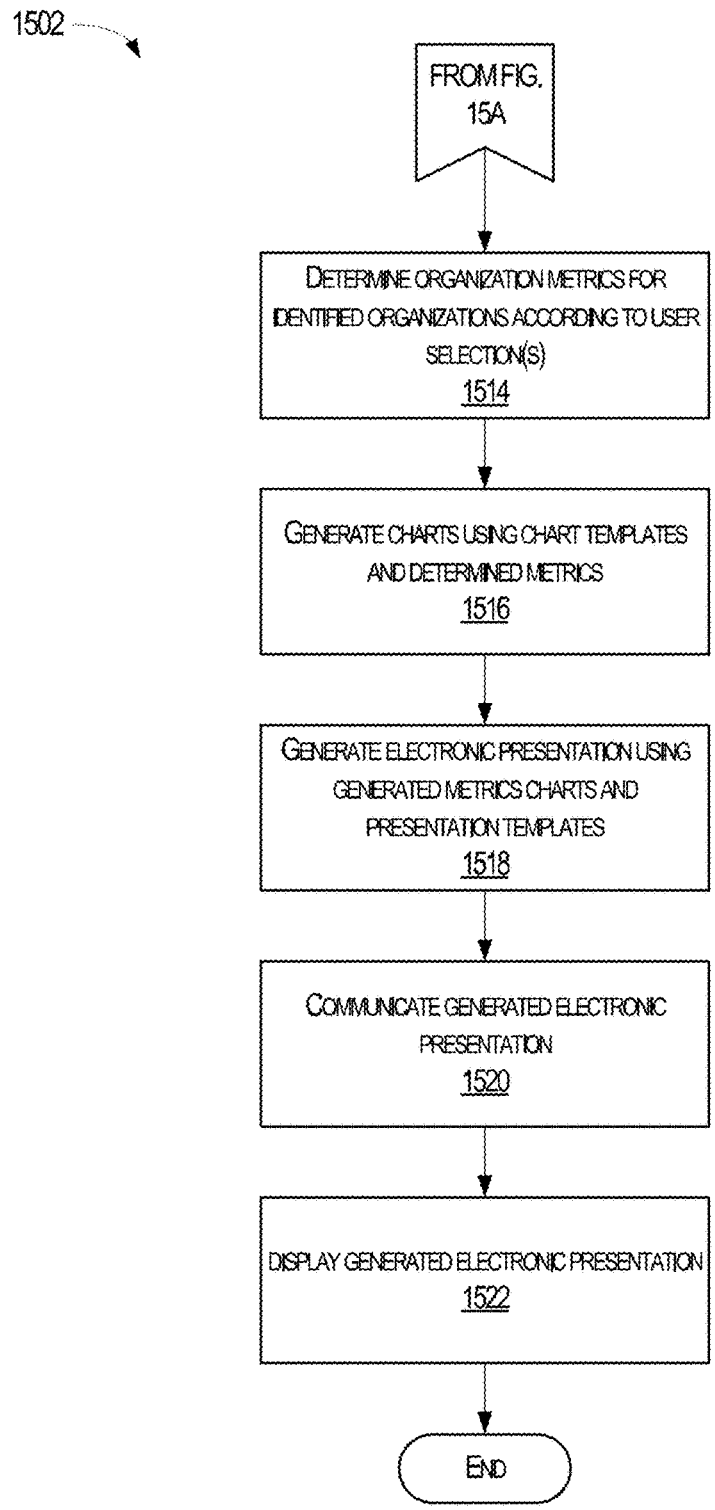

FIGS. 15A-15B illustrate a method 1502, according to an example embodiment, for generating a requested electronic document leveraging economic data, according to an example embodiment. One or more of the modules 208 may implement the method 1502, which is discussed by way of reference thereto.

Referring first to FIG. 15A, the social networking server 112 receives one or more user selections 232 that defines the parameters for generating electronic document (Operation 1504). As discussed above, and with reference to FIG. 4, the user selections 232 may include a template option 404, a location option 406, and a date option 408. Using the received user selections 232, the social networking server 112 then identifies and/or retrieves, via the data processing engine 216 and/or the database engine 214, member profiles from member profile(s) data 224 (Operation 1506) and organization profiles from organization profile(s) data 226 (Operation 1508).

The social networking server 112 then extracts one or more attribute values from the identified member profiles and the identified organization profiles (Operation 1510). As discussed above, and with reference to FIG. 2, in one embodiment, the attribute values extracted from the member profiles are stored as member profile attribute values 228 and the attribute values extracted from the organization profiles are stored as the organization profile attribute values 230. Furthermore, the attribute values to extract are determined from the chart template(s) 234 and the determined metrics 238 that are to be generated and calculated, respectively, for the requested electronic presentation.

As explained above, the social networking server 112 uses the extracted attribute values 228, 230 and the received user selections 232 to calculate the determined metrics 238 (Operations 1512-1514). In one embodiment, the determined metrics are grouped into metrics for the selected member profiles (Operation 1512) and metrics for the selected organization profiles (Operation 1514, FIG. 15B). The metrics 238 may be calculated by the charting module 220 and/or the presentation module 222. In another embodiment, the charting module 220 and/or the presentation module 222 facilitate communication with an external system (e.g., a Tableau server) that performs the calculations of the metrics 238 and incorporates such metrics 238 into one or more charts for the requested electronic presentation.

Referring to FIG. 15B, the social networking server 112 then generates charts from one or more chart templates 234 and the determined metrics 238 (Operation 1516). As discussed above, the requested electronic presentation may include one or more electronic documents, where each electronic document is associated with a corresponding chart template (e.g., selected from the chart template(s) 234). The extracted attribute values 228, 230 and the determined metrics 238 are then used as the chart elements for a chart defined by a corresponding chart template. In this regard, the charting module 220 performs the generation of the chart defined by the chart template. The chart template(s) 234 may define different chart types such as a ranked listing chart, a horizontal bar chart, a circular chart, a | vertical bar chart, a heat map, and other such types of charts or combination of charts.

The generated charts are then included in the electronic presentation to be communicated to the user 122 and/or client device 104. In this regard, the social networking server 112 generates the electronic presentation from the various electronic documents and charts (Operation 1518). As discussed above, the resulting electronic presentation may be a Microsoft PowerPoint presentation, an Apple Keynote presentation, or other such presentation. The electronic presentation is then stored as one of the electronic presentations 240, which may be retrieved by the user 122 and/or client device 104 at a future or later date. The electronic presentation is then communicated, via the communication interface 202, to the user 122 and/or client device 104 (Operation 1520). The electronic presentation is then displayed to the user 122 via the client device 104 (Operation 1522).

In this manner, this disclosure provides systems and methods for generating electronic presentations that convey large amounts of economic data in a manageable and meaningful way that otherwise would be difficult to do. As policymakers are often looking for ways to interpret economic data, this disclosure provides a streamlined process by which a policymaker or other individual can request an electronic presentation that encapsulates data for a selected geographic location. The systems and methods disclosed herein are technically beneficial because they negate the need to use multiple, disparate systems to make sense out of large data sets. Furthermore, as the member profiles disclosed herein are updated by members, the data is more likely to be accurate and timely than other sets of data (e.g., Census data). In addition, the metrics and comparisons disclosed herein are more detailed and granular than other sets of data freely or commercially available. Finally, the systems and methods disclosed herein leverage a single source (e.g., the disclosed social networking service) in obtaining the determined metrics and electronic presentations, thus, there is less likelihood to be data discrepancies, mismatches, or missing data, than if the data were to be obtained from different sources.

As the economic data presented herein spans many different groups, both individuals and organizations, it can be extremely difficult to work with and challenging to make sense of. However, the systems and methods disclosed herein streamline this process and reduce this data set to figures and numbers that are easily consumable, which can have real-world implications when policymakers decide to rely on this data.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-15B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 16:
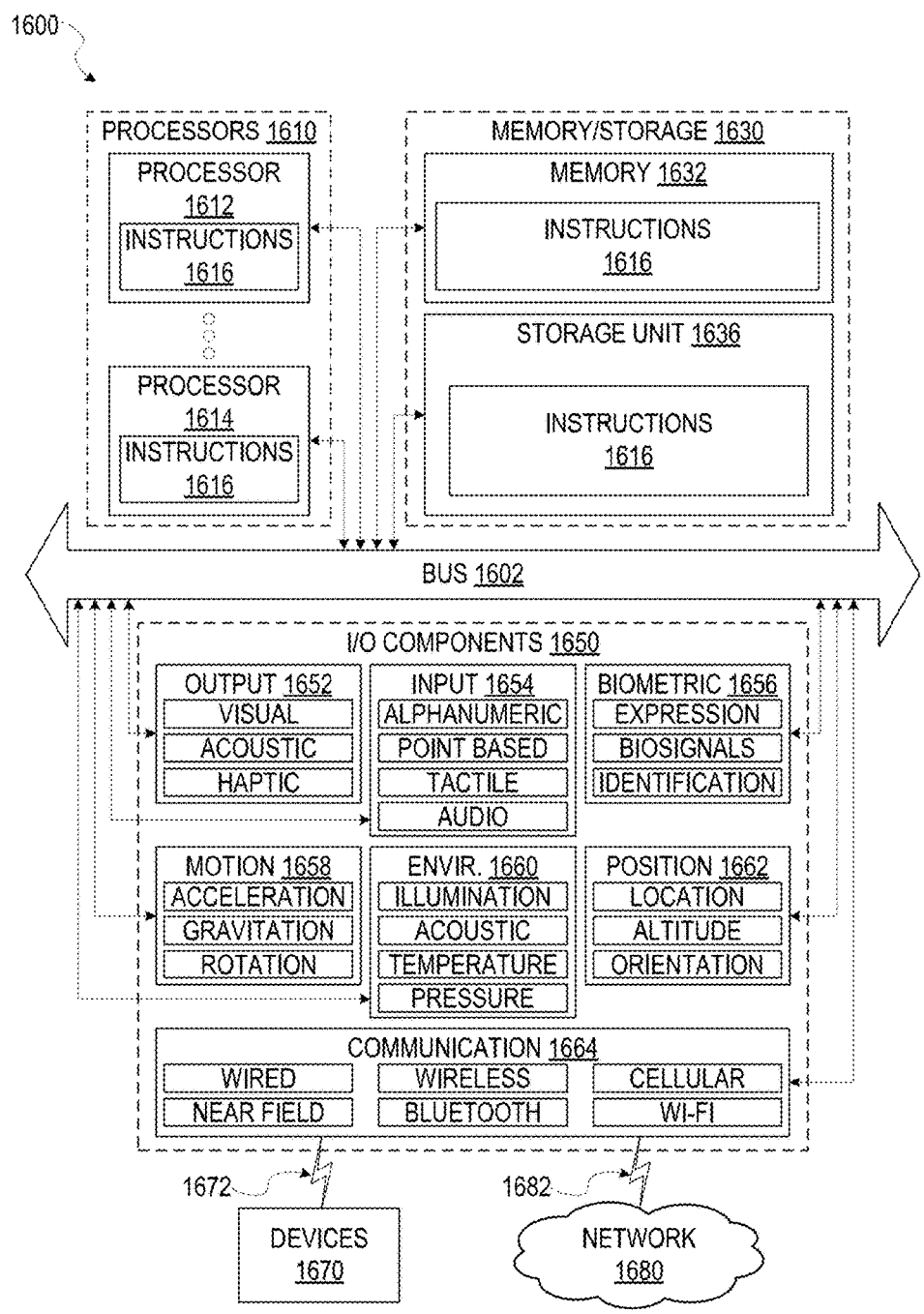
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example the instructions 1616 may cause the machine 1600 to execute the flow diagrams of FIGS. 15A-15B. Additionally, or alternatively, the instructions 1616 may implement one or more of the components of FIG. 2. The instructions 1616 transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a personal digital assistant (PDA), or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions 1616 contemporaneously. Although FIG. 16 shows multiple processors 1610, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions (e.g., instructions 1616) and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   a machine-readable medium storing computer-executable instructions; and
   at least one hardware processor communicatively coupled to the machine-readable medium that, when the computer-executable instructions are executed; the at least one hardware processor is configured to:
   receive a plurality of user selections, the user selections specifying labor market options for generating an electronic presentation incorporating labor market information corresponding to the plurality of user selections;
   identify a plurality of member profiles stored in a member profile database using at least one of the plurality of user selections, each member profile corresponding to an individual member of a social networking service;
   identify a plurality of organization profiles of the of the member profile database using the at least one of the plurality of user selections; each organization profile corresponding to an organizational member of the social networking service;
   extract a first plurality of attribute values from the plurality of member profiles and a second plurality of attribute values from the plurality of organization profiles, the first plurality and second plurality of attribute values based on at least one of the received plurality of user selections;
   determine a plurality of member metric values from the first plurality of attribute values and a plurality of organization metric values from the second plurality of attribute values; at least one of the member metric values being associated with a first economic category that relates to at least one of the plurality of user selections and at least one of the organization metric values being associated with a second economic category that relates to at least one of the plurality of user selections;
   generate a first chart incorporating at least one member metric value, the first chart being generated according to a first chart template defining the first chart;
   generate a second chart incorporating at least one organization metric value, the second chart being generated according to a second chart template defining the second chart;
   generate an electronic presentation that incorporates the first generated chart and the second generated chart; and
   communicate the generated electronic presentation for display.

2. The system of claim 1, wherein the electronic presentation is associated with a plurality of chart templates, wherein the plurality of chart templates defines different types of chart for inclusion in the electronic presentation.

3. The system of claim 1, wherein the electronic presentation comprises a first portion associated with the first economic category and a second portion associated with the second economic category.

4. The system of claim 1, wherein the first plurality of attribute values comprises one or more skill attribute values, one or more educational attribute values, and one or more employment history attribute values.

5. The system of claim 1, wherein the second plurality of attribute values comprises a number of employees employed at an organization corresponding to at least one of the attribute values selected from the second plurality of attribute values.

6. The system of claim 1, wherein the plurality of user selections comprises a template option indicating a type of electronic presentation to generate, a location option indicating a geographic location from which to identify the plurality of member profiles and the plurality of organization profiles, and a date option indicating a boundary for using the first plurality of attribute values or the second plurality of attribute values.

7. The system of claim 1, wherein the first chart comprises a graphical visualization of at least one type of attribute value selected from the first plurality of attribute values.

8. A method comprising:
- receiving, by at least one hardware processor, a plurality of user selections, the user selections specifying labor market options for generating an electronic presentation incorporating labor market information corresponding to the plurality of user selections;
- identifying, by at least one hardware processor, a plurality of member profiles stored in a member profile database using at least one of the plurality of user selections, each member profile corresponding to an individual member of a social networking service;
- identifying, by at least one hardware processor, a plurality of organization profiles stored in the member profile database using the at least one of the plurality of user selections, each organization profile corresponding to an organizational member of the social networking service;
- extracting, by at least one hardware processor, a first plurality of attribute values from the plurality of member profiles and a second plurality of attribute values from the plurality of organization profiles, the first plurality and second plurality of attribute values based on at least one of the received plurality of user selections;
- determining, by at least one hardware processor, a plurality of member metric values from the first plurality of attribute values and a plurality of organization metric values from the second plurality of attribute values, at least one of the member metric values being associated with a first economic category that relates to at least one of the plurality of user selections and at least one of the organization metric values being associated with a second economic category that relates to at least one of the plurality of user selections;
- generating, by at least one hardware processor, a first chart incorporating at least one metnber metric value, the first chart being generated according to a first chart template defining the first chart;
- generating, by at least one hardware processor, a second chart incorporating at least one organization metric value, the second chart being generated according to a second chart template defining the second chart;
- generating, by at least one hardware processor, an electronic presentation that incorporates the first generated chart and the second generated chart; and
- communicating, by at least one communication interface, the generated electronic presentation for display.

9. The method of claim 8, wherein the electronic presentation is associated with a plurality of chart templates, wherein the plurality of chart templates define different types of chart for inclusion in the electronic presentation.

10. The method of claim 8, wherein the electronic presentation comprises a first portion associated with the first economic category and a second portion associated with the second economic category.

11. The method of claim 8, wherein the first plurality of attribute values comprises one or more skill attribute values, one or more educational attribute values, and one or more employment history attribute values.

12. The method of claim 8, wherein the second plurality of attribute values comprises a number of employees employed at an organization corresponding to at least one of the attribute values selected from the second plurality of attribute values.

13. The method of claim 8, wherein the plurality of user selections comprises a template option indicating a type of electronic presentation to generate, a location option indicating a geographic location from which to identify the plurality of member profiles and the plurality of organization profiles, and a date option indicating a boundary for using the first plurality of attribute values or the second plurality of attribute values.

14. The method of claim 8, wherein the first chart comprises a graphical visualization of at least one type of attribute value selected from the first plurality of attribute values.

15. A machine-readable medium storing computer-executable instructions that, when executed by at least one hardware processor, causes the at least one hardware processor to perform a plurality of operations, the operations comprising:
- receiving a plurality of user selections, the user selections specifying labor market options for generating an electronic presentation incorporating labor market information corresponding to the plurality of user selections;
- identifying a plurality of member profiles stored in a member profile database using at least one of the plurality of user selections, each member profile corresponding to an individual member of a social networking service;
- identifying a plurality of organization profiles stored in the member profile database using the at least one of the plurality of user selections, each organization profile corresponding to an organizational member of the social networking service;
- extracting a first plurality of attribute values from the plurality of member profiles and a second plurality of attribute values from the plurality of organization profiles, the first plurality and second plurality of attribute values based on at least one of the received plurality of user selections;
- determining a plurality of member metric values from the first plurality of attribute values and a plurality of organization metric values from the second plurality of attribute values, at least one of the member metric values being associated with a first economic category that relates to at least one of the plurality of user selections and at least one of the organization metric values being associated with a second economic category that relates to at least one of the plurality of user selections;
- generating a first chart incorporating at least one member metric value, the first chart being generated according to a first chart template defining the first chart;
- generating a second chart incorporating at least one organization metric value, the second chart being generated according to a second chart template defining the second chart;
- generating an electronic presentation that incorporates the first generated chart and the second generated chart; and
- communicating the generated electronic presentation for display.

16. The machine readable-medium of claim 15, wherein the electronic presentation is associated with a plurality of chart templates, wherein the plurality of chart templates defines different types of chart for inclusion in the electronic presentation.

17. The machine readable-medium of claim 15, wherein the electronic presentation comprises a first portion associated with the first economic category and a second portion associated with the second economic category.

18. The machine readable-medium of claim 15, wherein the first plurality of attribute values comprises one or more skill attribute values, one or more educational attribute values, and one or more employment history attribute values.

19. The machine readable-medium of claim 15, wherein the second plurality of attribute values comprises a number of employees employed at an organization corresponding to at least one of the attribute values selected from the second plurality of attribute values.

20. The machine readable-medium of claim 15, wherein the plurality of user selections comprises a template option indicating a type of electronic presentation to generate, a location option indicating a geographic location from which to identify the plurality of member profiles and the plurality of organization profiles, and a date option indicating a boundary for using the first plurality of attribute values or the second plurality of attribute values.

\* \* \* \* \*

UNITED STATES PATENT AND TRADEMARK OFFICE
CERTIFICATE OF CORRECTION

Page 1 of 1

PATENT NO. : 10,455,032 B2
APPLICATION NO. : 15/007012
DATED : October 22, 2019
INVENTOR(S) : Kritzer et al.

It is certified that error appears in the above-identified patent and that said Letters Patent is hereby corrected as shown below:

In the Claims

In Column 25, Line 61, in Claim 1, delete "executed;" and insert --executed,-- therefor In Column 26, Line 6, in Claim 1, after "profiles", delete "of the"

In Column 26, Line 8, in Claim 1, delete "selections;" and insert --selections,-- therefor In Column 26, Line 21, in Claim 1, delete "values;" and insert --values,-- therefor In Column 27, Line 36, in Claim 8, delete "metnber" and insert --member-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*